Figure 1:
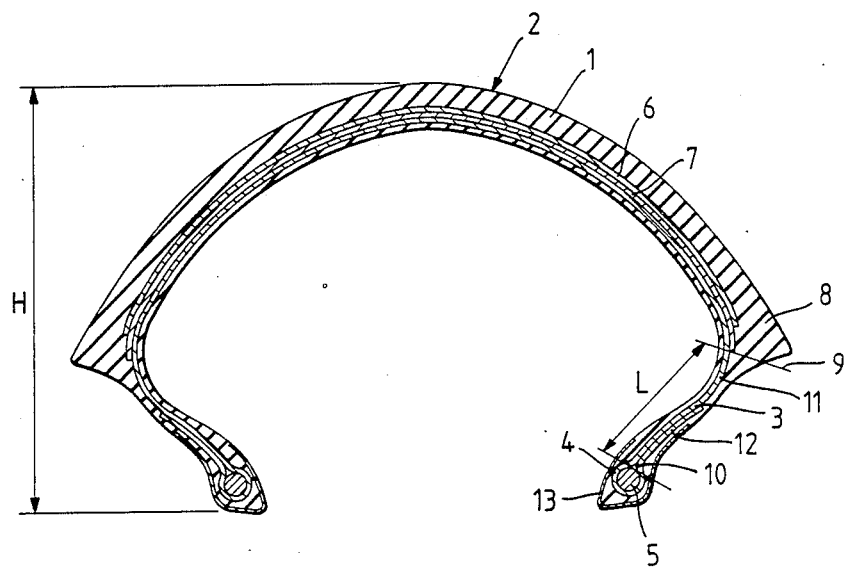

United States Patent [19]

Ingley et al.

[11] Patent Number: 4,790,363
[45] Date of Patent: Dec. 13, 1988

[54] RADIAL MOTORCYCLE TIRES

[75] Inventors: Peter Ingley, Amington; David R. Watkins, Birmingham; Gerald A. Griffiths, Lichfield, all of Great Britain

[73] Assignee: SP Tyres UK Limited, Birmingham, England

[21] Appl. No.: 933,379

[22] Filed: Nov. 21, 1986

[30] Foreign Application Priority Data

Dec. 7, 1985 [GB] United Kingdom ............... 8530213

[51] Int. Cl.⁴ ........................ B60C 9/08; B60C 13/00
[52] U.S. Cl. .................................. 152/454; 152/560
[58] Field of Search ............... 152/209 R, 454, 548, 152/552, 554, 560

[56] References Cited

U.S. PATENT DOCUMENTS 3,532,150 10/1970 Wittneben ................. 152/560 X
4,112,994 9/1978 Mills et al. ................ 152/454 X

FOREIGN PATENT DOCUMENTS 60-213503 10/1985 Japan ...................... 152/560
60-236804 11/1985 Japan ...................... 152/560
1222759 2/1971 United Kingdom.
2102354 2/1983 United Kingdom ......... 152/554

Primary Examiner—David Simmons
Assistant Examiner—Ramon R. Hoch
Attorney, Agent, or Firm—Birch, Stewart, Kolasch, & Birch

[57] ABSTRACT

A radial motorcycle tire comprising a ground contacting tread region reinforced between its edges by a breaker structure and having a substantially curved profile in the radial cross-section of the tire, a pair of tire beads each reinforced by a substantially inextensible bead reinforcement hoop and a tire sidewall disposed between each tread edge and bead region tire wherein each sidewall is reinforced by not more than two mutually contacting layers of carcass ply reinforcement for at least 80% of the length of the sidewall from the tread edge to the bead hoop with no other reinforcement fabric component being provided such that the said 80% or more of the sidewall is substantially flexible. The sidewall preferably contains virtually no apex strip and is also short, i.e. less than 35% of the tire sectional height (H).

7 Claims, 1 Drawing Sheet

RADIAL MOTORCYCLE TIRES

The present invention relates to radial motorcycle tires both for high speed road use and racing use.

When considered in cross-section radial motorcycle tires have sharply curved tread regions reinforced to provide for tread stability and interconnected at each edge to bead regions by flexible tire sidewalls which are replaced by radially extending reinforcement cores. The reinforcement cords are anchored in the bead regions by wrapping them around bead reinforcement cords or hoops and hard rubber apex members are positioned on the bead cores projecting radially outwardly to provide bead and lower sidewall stiffness.

High performance radial motorcycle tires have begun to use additional sidewall stiffening components in both the shoulder and lower sidewall areas to enhance the stability of the tire section and provide for good vehicle handling.

The inventors of the present invention have found, however, that an opposite approach when carried out in a particular way can give good stability and handling but provide an addition and most unexpected improvement in tire to road grip.

According to one aspect of the present invention a radial motorcycle tire is provided comprising a ground contacting tread region reinforced between its edges by a breaker structure and having a substantially curved profile in the radial cross-section of the tire, a pair of tire beads, each reinforced by a substantially inextensible bead reinforcement hoop and between each tread edge and bead region a tire sidewall wherein each sidewall is reinforced by not more than two mutually contacting layers of carcass ply reinforcement for at least 80% of the length of the sidewall from tread edge to bead hoop and with no other reinforcement fabric component being provided, such that the said 80% or more of the sidewall is substantially flexible.

Preferably the sidewall includes not more than two inwardly contacting layers of carcass ply reinforcement for at least 90% of the length of the sidewall to further extend the length of the sidewall which is flexible. The carcass ply reinforcements are in mutual contact so that maximum flexibility is obtained and it should be noted that the lack of an apex strip of the bead core provides this mutual contact and full flexibility right down to the bead reinforcement itself.

Preferably for at least 50% of the sidewall length from the tread edge towards the bead there is only one layer of carcass ply reinforcement by means of the ply overlap being short and this may be further shortened so that for at least 80% of the sidewall length there is only one layer.

The preferred tire carcass has only a single ply of reinforcement material without ply overlap.

The shape of the tire in cross-section may be such that the two tire sidewalls each extend entirely radially and axially inwardly of the tread edges and preferably the length of the tire sidewalls is less than 35%, or more preferably less than 25%, of the tire sectional height.

Further aspects of the present invention will be apparent from the following description, by way of example only, of one embodiment of the present invention which relates to a 375/700 18 inch motorcycle racing tire of the slick or patternless type.

The tire comprises a tread region which has a convex ground engaging surface (2) to allow for banking over of the machine and a toroidal carcass which together with the wheel rim (not shown) forms the air chamber for the tire. The carcass comprises sidewall (3) and bead regions (4) reinforced by bead reinforcement hoops (5). The tread region (1) is reinforced by two fabric breaker reinforcement plies (6, 7) each comprising conventional weftless tire fabric and these breaker plies (6, 7) extend into the tread edge regions (8).

The sidewalls (3) which extend radially and axially inwards of the tread edge regions (8) are shorter than any conventional tires and thus represent approximately 30% of the sectional height of the tire H. The length of the sidewalls (3) being measured from the extremity (9) of the tread edge to the nearest surface position 10 of the bead reinforcement (5) is marked L in the drawing.

The carcass of the tire is reinforced by a single radial carcass reinforcement ply (11) which comprises substantially weftless textile tire fabric arranged with the cord at 0° to the radial plane. It should be appreciated, however, that small angles may still be used of this ply in the conventional manner for radial tires. The carcass ply (11) is anchored to the bead reinforcement (5) by being wrapped around it and extending radially outwards for providing a ply overlap region (12). The ply overlap region extends for an outstanding of L over 2 from the surface portion (10) of the bead reinforcement (5). In the ply overlap region (12) the reinforcement material of the overlap is adjacent to the main reinforcement and any conventional bead apex member can be provided. The resultant sidewall reinforcement, which is substantially shorter than previous tires of this type, provides a tire structure which is stable, gives good vehicle handling and yet provides a lighter tire than heretofore. Most importantly, however, an unexpected advantage is obtained in that the tire when considered in the banked, over construction of the motorcycle has been found to have an increased contact area when compared to an identical tire with standard sidewall length and construction including apex strips. This most unexpected advantage is particularly valuable in providing increased cornering power for racing machines.

The tire shown also includes a bead chafer strip (13) extending around the bead region but having no effect on the present invention. While, so far, the present invention has been found to be particularly useful for motorcycle racing tires, the present invention is not so limited and applies also to motorcycle tyres for other purposes whether the high degree of tire stability provided and the high grip are required.

Having now described our invention what we claim is:

1. A radial tire having a very flexible and very short sidewall which consists essentially of a ground contacting tread region reinforced between its edges by a breaker structure and having a substantially curved profile in the radial cross-section of the tire, a pair of tire beads each reinforced by a substantially inextensible bead reinforcement hoop and a tire sidewall disposed between each tread edge and bead region, wherein each sidewall is reinforced by not more than two mutually contacting layers of carcass ply reinforcement for at least 80% of the length of the sidewall from the tread edge to the bead, such that the 80% or more of the sidewall is substantially flexible, the tire sidewalls edges and the length of the tire sidewalls each extending radially and axially inwardly of the tread edges and the length the tire sidewalls being less than 35% of the tire sectional height whereby the sidewalls are short and flexible.

2. The radial motorcycle tire according to claim 1 wherein for at least 90% of the length of the sidewall, the sidewall includes not more than two mutually contacting layers of carcass ply reinforcement.

3. The radial motorcycle tire according to claim 1 wherein for at least 50% of the sidewall length from the tread edge towards the bead edge there is only one layer of carcass ply reinforcement.

4. The radial motorcycle tire according to claim 1 wherein for at least 80% of the sidewall length from the tread edge towards the bead edge there is only one layer of carcass ply reinforcement.

5. The radial tire according to claim 1 wherein the bead region has no bead apex strip or other hard rubber component extending radially outwards of the bead reinforcement hoop.

6. The radial tire according to claim 5 wherein the tyre sidewall includes only one ply carcass reinforcement material and there is no carcass ply overlap, the carcass ply being anchored only at the bead hoop.

7. The radial tire according to claim 1 wherein the length of the tyre sidewalls is less than 25% of the tire sectional height.

* * * * *